D. LENZI.
APPARATUS FOR DRYING FOOD.
APPLICATION FILED SEPT. 3, 1919
1,339,032.
Patented May 4, 1920.
2 SHEETS—SHEET 2.
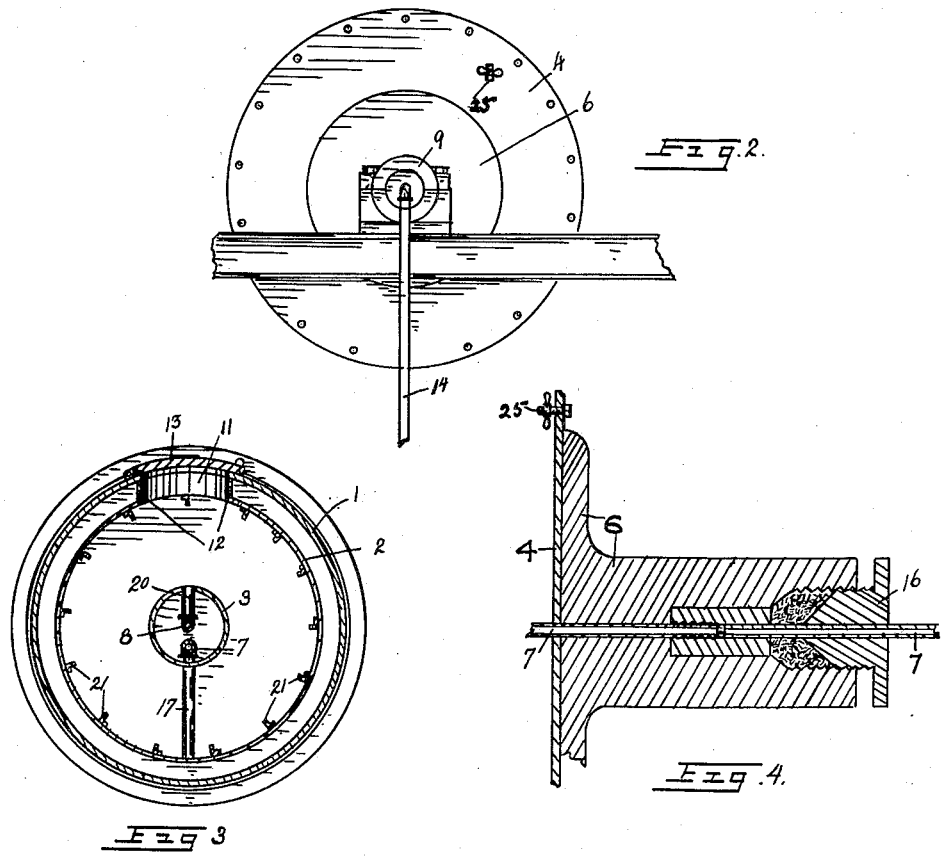

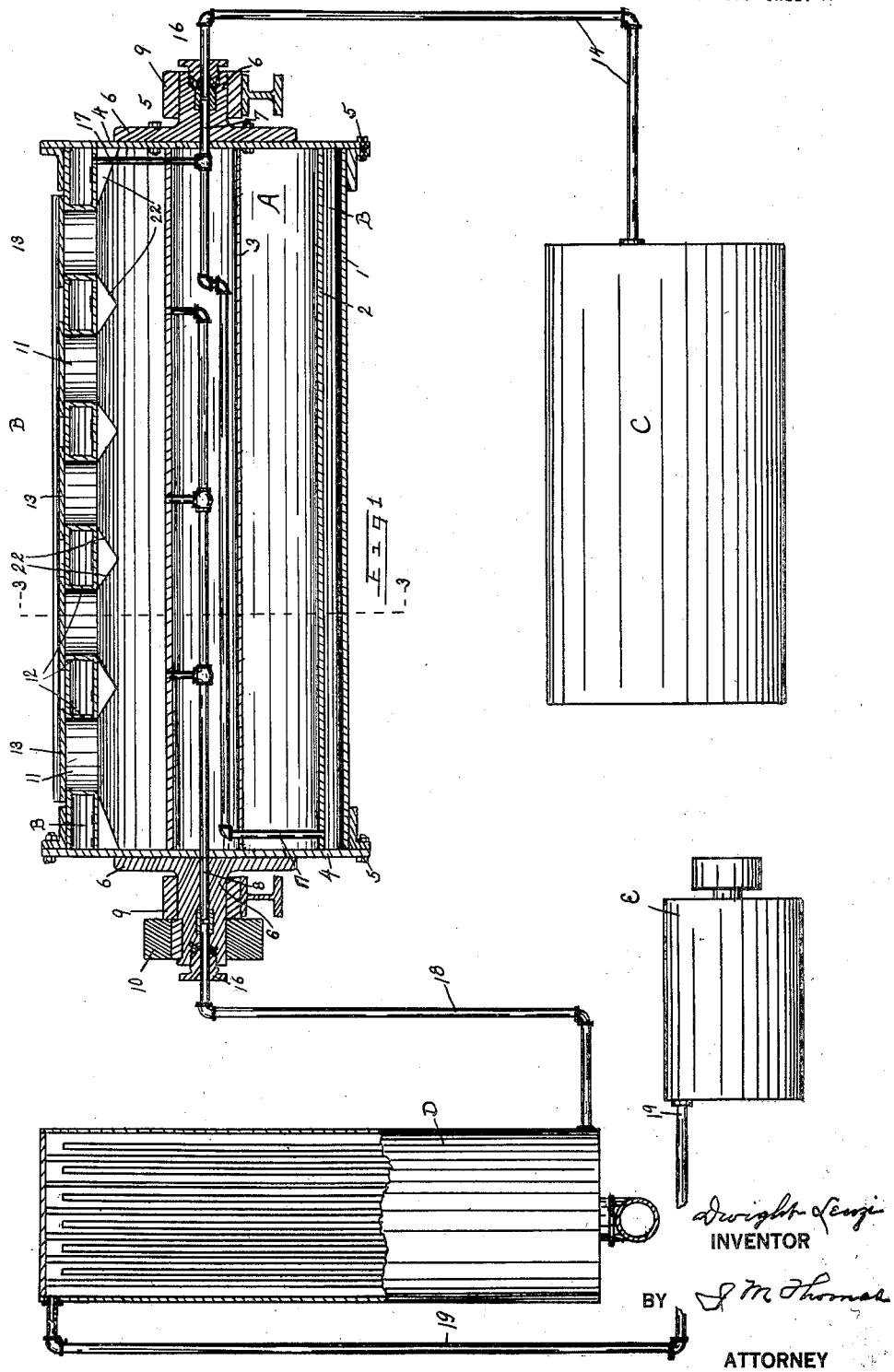

UNITED STATES PATENT OFFICE.

DWIGHT LENZI, OF IDAHO FALLS, IDAHO.

APPARATUS FOR DRYING FOOD.

1,339,032.  Specification of Letters Patent.  Patented May 4, 1920.

Application filed September 3, 1919. Serial No. 321,481.

*To all whom it may concern:*

Be it known that I, DWIGHT LENZI, a citizen of the United States, residing at Idaho Falls, in the county of Bonneville and State of Idaho, have invented certain new and useful Improvements in Apparatus for Drying Food, of which the following is a specification.

My invention relates to apparatuses for drying food such as vegetables, fruit and meat, and has for its object to provide a drier of the closed type having inlet and discharge openings, also I provide means for maintaining a vacuum in said drier whereby the material is treated while in said drier to a comparatively low degree of heat under vacuum whereby the moisture in the material is more rapidly evaporated than has been done by the use of other apparatuses for like purposes.

These objects I accomplish with the apparatus illustrated in the accompanying drawings in which similar letters and numerals of reference indicate like parts throughout the several figures and as described in the specification forming a part of this application and pointed out in the appended claims.

The invention consists in the novel construction and combination of parts herein described, a substantial embodiment of which is shown in the drawings in which Figure 1 is a plan view of the apparatus, parts shown in section, and parts cut away. Fig. 2 is an end elevation of the drier cylinder. Fig. 3 is a transverse section of the same cylinder on line 3—3 of Fig. 1. Fig. 4 is a longitudinal section showing in a detail the construction of the hot water or steam inlet and air exhaust with the packing glands of the drier cylinder.

The present invention enables me to introduce the material to be treated into the cylinder A and then to withdraw the air from around the said material and produce a vacuum in said cylinder while said material is subjected to heat by direct contact with the inner wall of the heated chamber B and also to quickly remove said material after it has been treated. The said drier consists of the cylindrical casing or outer shell 1 within which is concentrically fastened the heat cylinder 2, and within said heat cylinder 2 is also concentrically fastened the pipe or inner cylinder 3. The head plates 4 form heads common to all of said cylinders and are held in air tight position on said cylinders by the bolts 5. Centrally on each of said head plates 4 is secured the flanged boss 6 which bosses are journaled in the bearings 9, and said bosses are centrally bored to receive the heat pipe 7 at one end and the air exhaust pipe 8 at the other end. Bearings 9 are provided within which the said drier cylinder A is rotated by the pulley 10 which is keyed on one of said bosses 6. In the walls of said heat and outer casings are provided the feed and discharge openings 11 preferably circular in form and within each of which is secured the radially disposed casing 12, and on each of which is detachably fastened a cover plate 13, whereby the interior of said cylinder 2 may be kept air tight when closed and readily accessible to introduce and remove food material for treatment. I provide a heat reservoir C conveniently mounted and with a pipe 14 connecting the interior of said reservoir with the heat pipe 7, so that I may use hot air, water or any other heat element in the said chamber B. The said pipe 14 is held in alinement with said pipe 7 by being placed end for end with said pipe 7 and secured in said boss 6 by means of the packing gland 16 and with packing surrounding the junction of the said pipes 7 and 14. I provide radially disposed pipes 17 by which I connect the pipe 7 with the interior of said heat chamber B. The said exhaust pipe 8 is held in alinement with another pipe 18, which leads to the condenser D, by another packing gland 16. The said packing glands 16 are used to keep the interior of said chamber air tight while allowing the rotation of said cylinders on their axes. I provide an ejector E with which I withdraw the air from the cylinder A through the pipes 8, 18 condenser D and another pipe 19. The ejector may take the form of a suction fan, a suction pump or any other means of withdrawing the air from said chamber A. Radially disposed pipes 20 connect the interior of said chamber A with the said exhaust pipe 8. I provide longitudinally disposed ribs 21 which are made of angle iron that are bolted to the inner wall of said cylinder 2 to move and turn the food material while under treatment. This rolling and turning of the articles of food over and over as said cylinders are rotated, is the means I provide to keep the food material from burning, also to turn the food material in order that every particle may be similarly treated.

I provide a common cock valve 25, which is secured in one of said head plates 4, and opens to the interior of the heat cylinder 2, for releasing any cold air when heat is applied to or supplied within said cylinder 2.

The operation of my apparatus is as follows:—

The food material to be treated within said chamber A is introduced through one or any number of said openings 11 and the cover plates 13 are tightly held as a seal for said chamber A. Heat is then supplied through the pipes 14, 7 and 17 from the heat reservoir C to the interior of said casing B, which surrounds the treatment chamber A and then by withdrawing the air from the interior of said chamber A, I produce a high vacuum, and when this is done I am then able to treat said material at a lower temperature and in less time than has been previously practised and to produce a uniform product of superior quality. In order that every part of the material may receive the same treatment, I rotate said cylinders and as the cylinder 2 is rotated the said ribs 21 coming in contact with the material will cause it to roll or turn over and over and every portion will be evenly affected with the heat as applied by the surrounding heat chamber B. By the application of heat by contact with said cylinder 2 to the material while in a vaccum the moisture contained within or forming a part of the material is rapidly evaporated therefrom thus making it easily cured and preserved. When said evaporation has been effected the baffle plates 22 which are fastened in the inner wall of said chamber A will direct said material to the openings 11 through which said material may be removed and by stopping the rotation of said cylinders when said plates 13 are on the lower side of the said cylinders the material will fall by gravity from said chamber A.

Having thus described my apparatus and its operation I desire to secure by Letters Patent and claim:—

1. An apparatus for preserving food comprising a rotatable casing; a cylinder secured concentrically within said casing and spaced therefrom to form a heat chamber between said cylinder and said casing and openings leading from the interior of said cylinder through said casing; detachable closure plates to make said cylinder air tight; another cylinder taking the form of a pipe concentrically secured within said first mentioned cylinder; end plates with flanged bosses secured thereon, pipes centrally secured in said bosses and passed longitudinally through said last mentioned cylinder, whereby heat may be introduced into said heat chamber and air may be withdrawn from said first mentioned cylinder.

2. An apparatus for drying food comprising a rotatable casing; a cylinder spaced from and concentrically within said casing to form a heat chamber and having openings therefrom to the air; longitudinally disposed ribs secured on the inner wall of said cylinder; a pipe longitudinally and concentrically secured within said cylinder; a heat pipe longitudinally carried in said first mentioned pipe and with radially disposed branches leading to said heat chamber; an exhaust pipe also carried longitudinally in said first mentioned pipe with radially disposed branches leading to the interior of said first mentioned cylinder; means to withdraw air through said exhaust pipe to produce a vacuum within the first mentioned cylinder; and means to introduce heat through said heat pipe and supply heat in said heat chamber.

In testimony whereof I have affixed my signature.

DWIGHT LENZI.